(12) United States Patent
Wang et al.

(10) Patent No.: US 10,663,075 B2
(45) Date of Patent: May 26, 2020

(54) SHOWER CONTROL SYSTEM

(71) Applicant: XIAMEN SOLEX HIGH-TECH INDUSTRIES CO., LTD., Xiamen, Fujian (CN)

(72) Inventors: Qiang Wang, Fujian (CN); Lihong Hu, Fujian (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 152 days.

(21) Appl. No.: 15/973,017

(22) Filed: May 7, 2018

(65) Prior Publication Data

US 2018/0340624 A1  Nov. 29, 2018

(30) Foreign Application Priority Data

May 24, 2017  (CN) .......................... 2017 1 0373169

(51) Int. Cl.
| | |
|---|---|
| *F16K 11/00* | (2006.01) |
| *E03C 1/04* | (2006.01) |
| *F16K 31/04* | (2006.01) |
| *E03C 1/05* | (2006.01) |

(52) U.S. Cl.
CPC .......... *F16K 31/041* (2013.01); *E03C 1/0408* (2013.01); *E03C 1/055* (2013.01); *F16K 11/00* (2013.01); *Y10T 137/2514* (2015.04); *Y10T 137/86815* (2015.04); *Y10T 137/86879* (2015.04); *Y10T 137/87249* (2015.04)

(58) Field of Classification Search
CPC ..... Y10T 137/87249; Y10T 137/86815; Y10T 137/86879; Y10T 137/2514; F16K 31/041; F16K 11/00; F16K 11/02; F16K 37/00; E03C 1/0408; E03C 1/055; A47K 3/281

See application file for complete search history.

(56) References Cited

U.S. PATENT DOCUMENTS

| | | | | |
|---|---|---|---|---|
| 4,711,392 A | * | 12/1987 | Kidouchi | ................ F16K 11/20 137/332 |
| 4,867,375 A | * | 9/1989 | Ueki | ........................ B01F 5/008 236/12.12 |
| 4,909,435 A | * | 3/1990 | Kidouchi | ........... G05D 23/1393 236/12.12 |
| 5,058,804 A | * | 10/1991 | Yonekubo | ................. E03C 1/04 236/12.12 |

(Continued)

*Primary Examiner* — Matthew W Jellett
(74) *Attorney, Agent, or Firm* — Cooper Legal Group, LLC

(57) ABSTRACT

A shower control system has a controller and a control panel. The control panel includes a knob. The top surface of the knob has an inner ring and an outer ring; the outer ring has outlet buttons corresponding to a first outlet and a second outlet; when the outlet button is touched, the circuit of the controller sends a signal to the electromagnetic valve to open the first outlet or the second outlet; the inner ring is disposed with a display screen with a temperature displaying area, a volume displaying area, a temperature adjusting mode icon, a volume adjusting mode icon and a lock mode icon; when the knob is long pressed, the control panel is open, the inner ring lights up; the temperature displaying area, the volume displaying area of the displayer screen respectively displays the temperature and volume last used, and the lock mode icon is selected.

11 Claims, 14 Drawing Sheets

(56) References Cited

U.S. PATENT DOCUMENTS

| | | | | |
|---|---|---|---|---|
| 7,889,187 B2* | 2/2011 | Freier | ................ | G05D 23/1393 |
| | | | | 345/184 |
| 9,243,756 B2* | 1/2016 | Davidson | .................. | F17D 3/00 |
| 9,632,514 B2* | 4/2017 | Marty | ..................... | E03C 1/057 |
| 10,184,232 B2* | 1/2019 | Veros | ....................... | E03C 1/055 |
| 2007/0261161 A1* | 11/2007 | Avigdor | ............... | E03C 1/0408 |
| | | | | 4/598 |
| 2011/0186138 A1* | 8/2011 | Hanna | ....................... | E03C 1/05 |
| | | | | 137/1 |

* cited by examiner

SHOWER CONTROL SYSTEM

FIELD OF THE INVENTION

The present invention relates to a shower device, particularly to a shower control system.

BACKGROUND OF THE INVENTION

Traditional shower room applies mechanical switch to adjust the inlet and outlet volume, the water temperature and the outlet terminal. The mechanical adjusting way is not direct and the adjustment is not accurate enough. If the user applies an excessive force or a smaller force, the volume or temperature changes excessively that can satisfy an accurate adjustment.

To solve above mentioned problem, there is an electrical controller to adjust the temperature and the volume in a control box, the control box is connected to the outlet terminal. The user can only press the button of the control box to adjust the temperature and the volume. This kind of electrically adjusting way can achieve accurate temperature and volume adjustment by the operation of the users.

But this kind of the electrically adjusting way needs more buttons, and it is weak in visualization degree, moreover, it is not convenient for user to operate during showering.

SUMMARY OF THE INVENTION

The present invention is provided with a shower control system, which has simple operation and clear logic and is convenient for user to operate during showering.

The technical proposal of the present invention is that:

A shower control system, wherein comprising a controller and a control panel;

the controller comprises a cool water inlet and a hot water inlet, cool water and hot water respectively flow into two chambers of a pressure balanced valve through the cool water inlet and the hot water inlet;

two chambers of the pressure balanced valve are connected to a mixing water chamber of a temperature control valve respectively through a cool water inlet hole and a hot water inlet hole, the temperature control valve is controlled by a first stepper motor to adjust the water area of the cool water inlet hole and the hot water inlet hole so as to adjust the proportion of the cool water and hot water in the mixing water chamber;

the temperature control valve further comprises a mixing water outlet hole connected to a volume regulation valve; the volume regulation valve comprises a pivot valve and a second stepped motor, the second stepped motor adjusts the water area of the outlet opening of the pivot valve;

the outlet opening of the pivot valve is connected to a first outlet and a second outlet;

the first outlet and the second outlet are respectively disposed with an electromagnetic valve to control to close and open;

the control panel comprises a knob, the top surface of the knob is disposed with an inner ring and an outer ring; the outer ring is disposed with outlet buttons corresponding to the first outlet and the second outlet; when the outlet button is touched, the circuit of the controller sends a signal to the electromagnetic valve to control the first outlet or the second outlet to open;

the inner ring is disposed with a display screen with a temperature displaying area, a volume displaying area, a temperature adjusting mode icon, a volume adjusting mode icon and a lock mode icon;

when the knob is long pressed, the control panel is open, the inner ring lights up; the temperature displaying area, the volume displaying area of the displayer screen respectively displays the temperature and volume at the last time's use, and the lock mode icon is selected; at this time, when one outlet button of the outer ring is touched, the outlet button lights up, the outlet terminal corresponding to the outlet button discharges water out according to the temperature and volume at the last time's use;

when the knob is pressed, the control panel enters lock mode, the outlet temperature and outlet volume change to preset values in the lock mode; at this time, when the knob is rotates, the outlet temperature and the outlet volume do not change;

in the lock mode, when the knob is rotated, if the temperature adjusting icon or the volume adjusting mode icon is selected and the knob is pressed again, the control panel enters temperature adjusting mode or volume adjusting mode; when the control panel enters temperature adjusting mode, the volume displaying area lights off; when the control panel enters volume adjusting mode, the temperature displaying area lights off; in the temperature adjusting mode or the volume adjusting mode, when the knob is rotated, the displaying content of the temperature displaying area or the volume displaying area changes; when the knob is pressed again, the displaying content of the temperature displaying area or the volume displaying area produces electrical signal to send to the first stepped motor or the second stepped motor to control the rotating area of the first or second stepped motor so as to change the temperature or the volume;

when the temperature or the volume adjusting is finished, if the knob is pressed again, the control panel exits the temperature adjusting mode or the volume adjusting mode.

In another preferred embodiment, the displaying content of the temperature display area is digital to display target outlet temperature.

In another preferred embodiment, the volume display area is an arc shaped volume meter disposed at the outer side of the temperature display area; in the volume adjusting mode, if the knob is rotated, the lighting area of the volume meter changes to be longer or shorter, the outlet volume is correspondingly increased or decreased.

In another preferred embodiment, the lock mode icon being locked means that the external periphery of the lock mode icon displays a lighting ring; the temperature or volume adjusting mode icon being selected means that the ring at the external periphery of the lock mode lights off, and the external periphery of the temperature or volume adjusting mode icon displays a lighting ring.

In another preferred embodiment, the display screen is further disposed with a timer display area, when the control panel starts up, the timer display area starts the timer to record shower duration.

In another preferred embodiment, when the control panel is in lock mode, temperature adjusting mode or volume adjusting mode, the outlet button at the outer ring keeps active, user can touch the outlet button to choose different outlet terminals.

In another preferred embodiment, the temperature control valve comprises an adjusting element and a fixing element embedded disposed; the adjusting element moves along the axis of the fixing element in relation to the fixing element under the action of the first stepped motor; the side wall of the adjusting element and the fixing element are respectively disposed with two water holes; the water holes of the adjusting element and the fixing element are correspondingly connected one by one to form the cool water inlet hole and the hot water inlet hole; when the adjusting element moves in relation to the fixing element, the coinciding area of the water hole of the adjusting element and the fixing element changes, making the water area of the cool water inlet hole and the hot water inlet hole change.

In another preferred embodiment, the pressure balancing valve comprises a stop element and a moving element, the stop element is disposed with a chamber, the side wall of the stop element is disposed with a hole connected to the chamber; the moving element is disposed in the chamber to divide the chamber into two chambers, flowing holes are respectively formed between the upper end and the lower end of the moving element and the upper surface and lower surface of the opening end;

when cool water and hot water flow to the two chambers, the cool water and hot water in the chambers respectively act a pressure force to the moving element in opposite directions; if the two pressure forces are not equal, the moving element moves to the chamber in a lowerpressure; then the flowing hole of the chamber in a higher pressure is reduced and the flowing hole of the chamber in a lower pressure is enlarged, thus balancing the two chambers.

In another preferred embodiment, the pivot valve comprises a plug which is coaxially arranged with the outlet of the pivot valve; when the second stepped motor rotates, the output shaft of the second stepped motor moves in the direction closing to the plug in the axial direction, the abutting force between the output shaft and the plug pushes the plug to insert to the outlet in the axial direction; the external periphery of the plug is disposed with a round step, the direction between the round step and the outlet is gradually reduced as the plug is inserting to the outlet, making the water area of the outlet reduced.

In another preferred embodiment, the cool water inlet hole, the hot water inlet hole and the mixing water outlet hole are respectively disposed with a temperature sensor. In another preferred embodiment, the controller is further disposed with a water supply module, which is a battery or a rectification filter circuit connected to the mains supply.

In another preferred embodiment, knob is disposed with an LCD, which is connected to the water supply module.

A shower control system, wherein comprising a controller and a control panel;

the controller comprises a cool water inlet and a hot water inlet, cool water and hot water respectively flow to two chambers of a pressure balanced valve through the cool water inlet and the hot water inlet;

two chambers of the pressure balanced valve are connected to a mixing water chamber of a temperature control valve respectively through a cool water inlet hole and a hot water inlet hole, the temperature control valve is controlled by a first stepper motor to adjust the water area of the cool water inlet hole and the hot water inlet hole so as to adjust the proportion of the cool water and hot water in the mixing water chamber;

the temperature control valve further comprises a mixing water outlet hole connected to a volume regulation valve; the volume regulation valve comprises a pivot valve and a second stepped motor, the second stepped motor adjusts the water area of the outlet opening of the pivot valve;

the outlet opening of the pivot valve is connected to a first outlet and a second outlet;

the first outlet and the second outlet are respectively disposed with an electromagnetic valve to control to close and open;

the control panel comprises a knob, the top surface of the knob is disposed with an inner ring and an outer ring; the inner ring is disposed with outlet buttons corresponding to the first outlet and the second outlet; when the outlet button is touched, the control panel starts up, the circuit of the controller sends a signal to the electromagnetic valve to control the first outlet or the second outlet to open; the outer ring is a temperature adjusting ring, when the temperature adjusting ring is rotated, the circuit of the controller sends a signal to the first stepped motor to rotate a circuit angle to adjust the outlet temperature;

the inner ring is further disposed with an indication light, which is light when the control panel starts.

In another preferred embodiment, the surface of the temperature adjusting ring is disposed with scales; the temperature adjusting ring, when being rotated, rotates in relation to the inner ring; when a scale of the temperature adjusting ring is rotated to the position over the indication light, the scale is corresponding to the present outlet temperature.

In another preferred embodiment, a rotating restricting structure is disposed between the inner ring and the temperature adjusting ring; when the temperature adjusting ring rotates to the position between two end points of the scale above the indication light, the temperature adjusting ring is restricted by the rotating restricting structure in the temperature reducing direction or the temperature raising direction.

In another preferred embodiment, the knob is embedded with a power.

Compared to the existing known technology, the technical proposal of the present invention has following effects:

1. The present invention is provided with a shower control system, which comprises a controller and a control panel; user can operate the control panel to adjust the temperature and volume. The process is visual, simple and direct, logically clear. At the same time, the controller and the control panel are separated, the controller thus can be concealed, only the control panel is left on the wall, providing simple, elegant and attractive appearance.

2. The present invention is provided with a shower control system that the control panel has the volume display area off when in temperature adjusting mode and vice verse. So in two adjusting modes, the display of the control panel varies widely, user can directly catch whether in temperature adjusting mode or in volume adjusting mode.

3. The present invention is provided with a shower control system, in which the temperature display area applies digital display, the volume display area applies scale display, widening the variety of the two display areas.

4. The present invention is provided with a shower control system, in which the controller is disposed with a pressure balancing valve in the cool water inlet and the hot water inlet, making that no matter the outlet pressure is balanced or not in the cool water inlet and the hot water inlet, the pressure of the cool water and the hot water from the pressure balancing valve are substantially equal. Therefore in the further temperature adjusting of the temperature control valve, as the pressure of the water from the cool water inlet hole and the hot water inlet hole of the temperature control valve are substantially equal, the proportion of the hot water and cool water in the mixing water chamber is changed practically to further change the temperature of the mixing water only if the water area of the cool water inlet hole and the hot water inlet hole of the temperature control valve changes.

5. The present invention is provided with a shower control system that the temperature control valve and the volume regulation valve rotate by the driving of stepped motors. The accuracy of temperature and volume adjusting is high, the adjusting is quick. With this structure, as the current to drive the stepped motor to rotate is small, the controller can apply embedded power to achieve the control process. This avoids main supply for traditional controller and avoids security problem in the shower room with heavy steam. Relatively, the control panel can also apply embedded battery or it can be powered by the controller.

6. The present invention is provided with a shower control system that the control panel has a lock mode, in which an available temperature and volume for most situation are preset; user can adjust the temperature and volume quickly by switching to the lock mode.

DETAILED DESCRIPTION OF THE EMBODIMENTS

The present invention will be further described with the drawings and embodiments.

Embodiment 1

Figure 1:
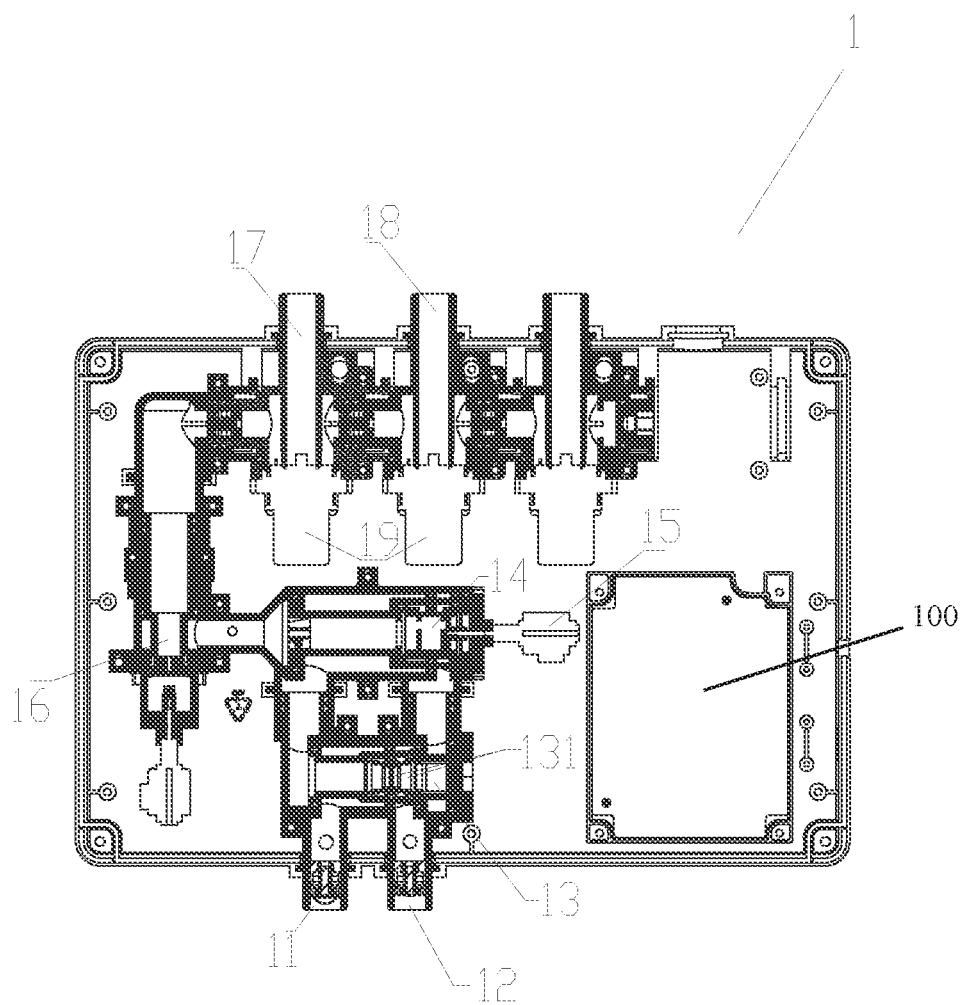
FIG. 1 illustrates a schematic diagram of a controller of Embodiment 1 of the present invention.

A shower control system comprises a controller 1 and a control panel 2;

Referring to FIG. 1, the controller 1 comprises a cool water inlet 11 and a hot water inlet 12, cool water and hot water respectively flow to two chambers 131 of a pressure balanced valve 13 through the cool water inlet 11 and the hot water inlet 13;

Two chambers 131 of the pressure balanced valve 13 are connected to a mixing water chamber 143 of a temperature control valve 14 respectively through a cool water inlet hole 141 and a hot water inlet hole 142, the temperature control valve 14 is controlled by a first stepper motor 15 to adjust the water area of the cool water inlet hole 141 and the hot water inlet hole 142 so as to adjust the proportion of the cool water and hot water in the mixing water chamber 143;

As the controller 1 is disposed with the pressure balancing valve 13 in the cool water inlet 11 and the hot water inlet 12, making that no matter the outlet pressure is balanced or not in the cool water inlet 11 and the hot water inlet 12, the pressure of the cool water and the hot water from the pressure balancing valve 13 are substantially equal. Therefore in the further temperature adjusting of the temperature control valve 14, as the pressure of the water from the cool water inlet hole 141 and the hot water inlet hole 142 of the temperature control valve 14 are substantially equal, the proportion of the hot water and cool water in the mixing water chamber 143 is changed practically to further change the temperature of the mixing water only if the water area of the cool water inlet hole 141 and the hot water inlet hole 142 of the temperature control valve 14 changes.

The temperature control valve 14 further comprises a mixing water outlet hole 146 connected to a volume regulation valve 16; the volume regulation valve 16 comprises a pivot valve 161 and a second stepped motor 162, the second stepped motor 162 adjusts the water area of the outlet opening 164 of the pivot valve 161;

the outlet opening 164 of the pivot valve 161 is connected to a first outlet 17 and a second outlet 18; the first outlet 17 and the second outlet 18 are respectively disposed with an electromagnetic valve 19 to control to close and open; in this embodiment, the first outlet 17 is connected to a hand shower head, the second outlet 18 is connected to a top spraying shower head; if the shower room is disposed with a bathtub, the controller 1 can be disposed with a third outlet or more outlets to connect to the bathtub or other outlet device. These are simple substantiations of this embodiment that they are not be further described.

Referring to FIGS. 8-12, the control panel 2 comprises a knob, the top surface of the knob is disposed with an inner ring 21 and an outer ring 23; the outer ring 23 is disposed with outlet buttons 231 corresponding to the first outlet 17 and the second outlet 18; when the knob starts up and the outlet button 231 is touched, the circuit of the controller 1 sends a signal to the electromagnetic valve 19 to control the first outlet 17 or the second outlet 18 to open;

The inner ring 21 is disposed with a LCD component 22 with a temperature displaying area 221, a volume displaying area 222, a temperature adjusting mode icon 223, a volume adjusting mode icon 224 and a lock mode icon 225;

When the knob is long pressed, the control panel 2 is open, the inner ring 21 lights up; the temperature displaying area 221, the volume displaying area 222 of the displayer screen respectively displays the temperature and volume at the last time's use, and the lock mode icon 225 is selected; at this time, when one outlet button 231 of the outer ring 23 is touched, the outlet button 231 lights up, the top spraying shower head or the hand shower head corresponding to the outlet button 231 discharges water out according to the temperature and volume at the last time's use; in this embodiment, the temperature at the last time is 40°, the volume is the max volume.

When the knob is pressed, the control panel 2 enters lock mode, the temperature adjusting mode icon 223 and the volume adjusting mode icon 224 go out, the lock mode icon 225 keeps illuminating; the outlet temperature and outlet volume change to preset values in the lock mode; at this time, when the knob is rotates, the outlet temperature and the outlet volume do not change; in this embodiment the outlet temperature in lock mode is 38°, the outlet volume is two seconds of the max volume.

In the lock mode, when the knob is rotated, if the temperature adjusting icon 223 or the volume adjusting mode icon 224 is selected and the knob is pressed again, the control panel 2 enters temperature adjusting mode or volume adjusting mode; when the control panel 2 enters temperature adjusting mode, the volume displaying area 222 lights off; when the control panel 2 enters volume adjusting mode, the temperature displaying area 221 lights off; in the temperature adjusting mode or the volume adjusting mode, when the knob is rotated, the displaying content of the temperature displaying area or the volume displaying area changes; when the knob is pressed again, the displaying content of the temperature displaying area 221 or the volume displaying area 222 produces electrical signal to send to the first stepped motor 15 or the second stepped motor 162 to control the rotating area of the first or second stepped motor so as to change the temperature or the volume;

When the temperature or the volume adjusting is finished, if the knob is pressed again, the control panel 2 exits the temperature adjusting mode or the volume adjusting mode.

As can be seen from above, user can operate the control panel 2 to adjust the temperature and volume. The process is visual, simple and direct, logically clear. At the same time, the controller and the control panel are separated, the controller 1 thus can be concealed, only the control panel 2 is left on the wall, providing simple, elegant and attractive appearance.

The control panel 2 has the volume display area 222 off when in temperature adjusting mode and vice verse. So in two adjusting modes, the display of the control panel 2 varies widely, user can directly catch whether in temperature adjusting mode or in volume adjusting mode.

Furthermore, in this embodiment, the displaying content of the temperature display area 221 is digital to display target outlet temperature. The volume display area 222 is an arc shaped volume meter disposed at the outer side of the temperature display area 221; in the volume adjusting mode, if the knob is rotated, the lighting area of the volume meter changes to be longer or shorter, the outlet volume is correspondingly increased or decreased. The temperature display area 221 applies digital display, the volume display area 222 applies scale display, widening the variety of the two display areas.

The lock mode icon 225 being locked means that the external periphery of the lock mode icon 225 displays a lighting ring; the temperature or volume adjusting mode icon being selected means that the ring at the external periphery of the lock mode lights off, and the external periphery of the temperature or volume adjusting mode icon displays a lighting ring.

In this embodiment, the display screen is further disposed with a timer display area 226, when the control panel 2 starts up, the timer display area 226 starts the timer to record shower duration.

When the control panel 2 is in lock mode, temperature adjusting mode or volume adjusting mode, the outlet button 231 at the outer ring keeps active, user can touch the outlet button to choose different outlet terminals in any of the three modes.

Figure 2:
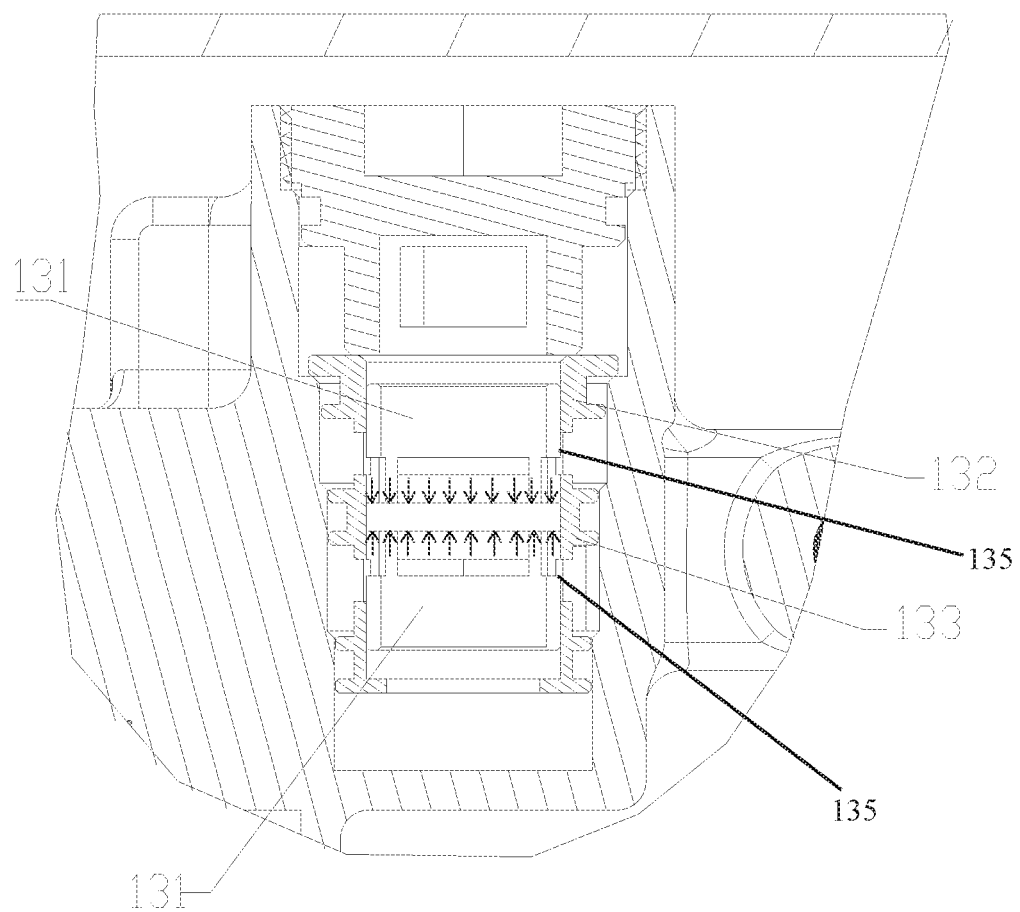
FIG. 2 illustrates a schematic diagram of a pressure balancing valve of Embodiment 1 when the hot water inlet hole and the cool water inlet hole are valid.
Figure 3:
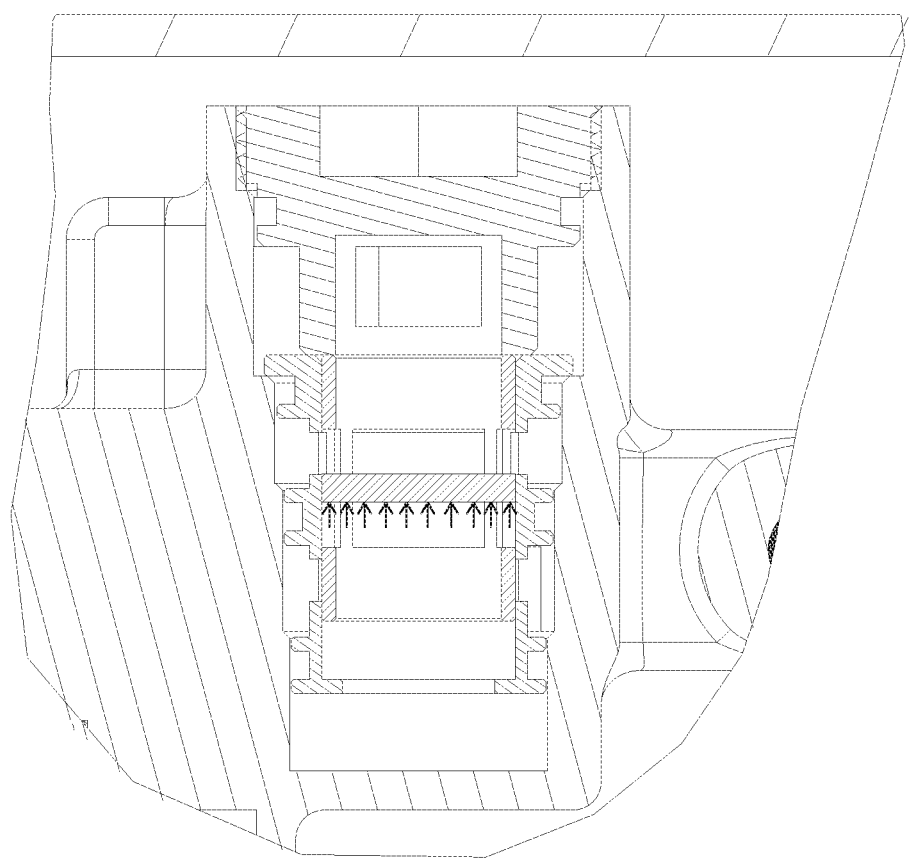
FIG. 3 illustrates a schematic diagram of the pressure balancing valve of Embodiment 1 when the hot water inlet hole is invalid.

Referring to FIG. 2 and FIG. 3, the pressure balancing valve 13 comprises a stop element 132 and a moving element 133. The stop element 132 is disposed with a chamber, and the side wall of the stop element 132 is disposed with a hole connected to the chamber. The moving element 133 is disposed in the chamber to divide the chamber into two chambers 131. Flowing holes 135 are respectively formed between the upper end and the lower end of the moving element and the upper surface and lower surface of the opening end.

when cool water and hot water flow to the two chambers 131, the cool water and hot water in the chambers 131 respectively act a pressure force to the moving element 133 in opposite directions; if the two pressure forces are not equal, the moving element 133 moves to the chamber 131 in a lowerpressure; then the flowing hole of the chamber 131 in a higher pressure is reduced and the flowing hole of the chamber 131 in a lower pressure is enlarged, thus balancing the two chambers 131.

Therefore, if there is no hot water flowing to the hot water inlet 12, the moving element 133 moves to the chamber 131 towards the cool water inlet 11 until it plugs the flowing hole of this chamber 131 and vice verse. So if the hot water inlet 12 or the cool water inlet 11 is invalid, the pressure balancing valve 13 has no water flowing to the temperature control valve 14, avoiding pure cool water pure hot water flowing out and injuring the user.

Figure 4:
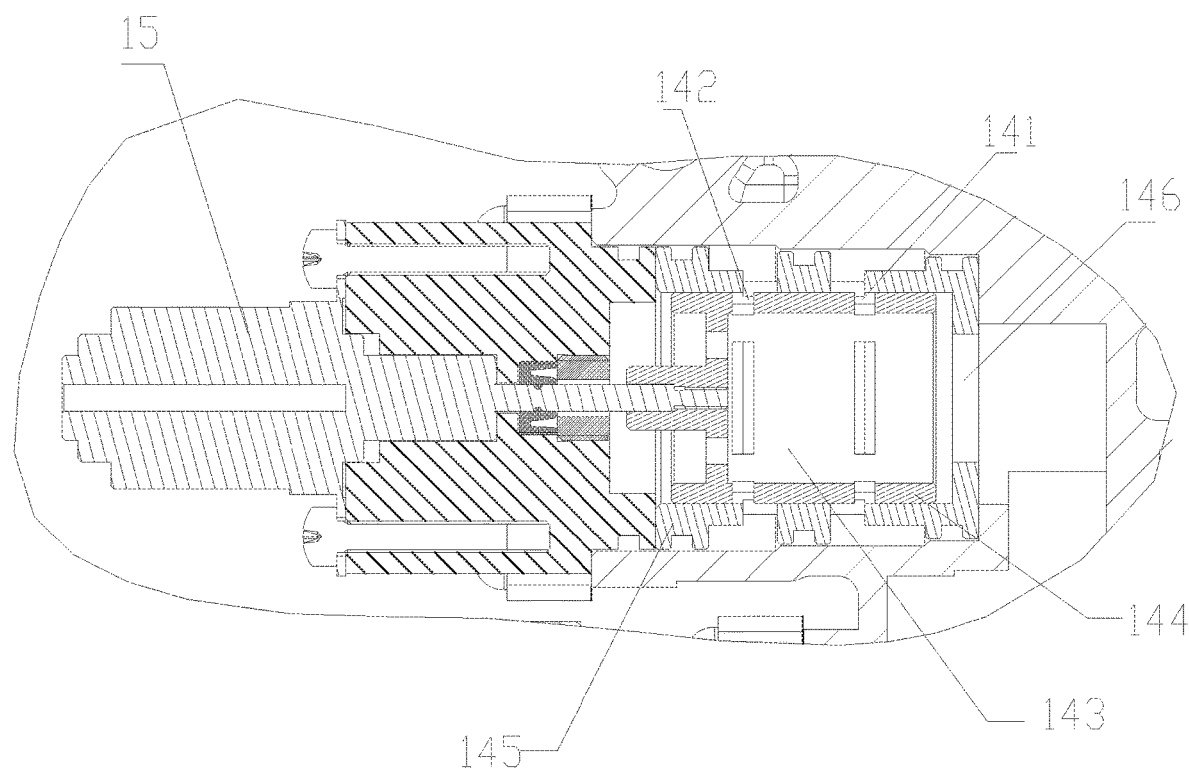
FIG. 4 and FIG. 5 illustrate the adjusting process of the temperature control valve of Embodiment 1.
Figure 5:
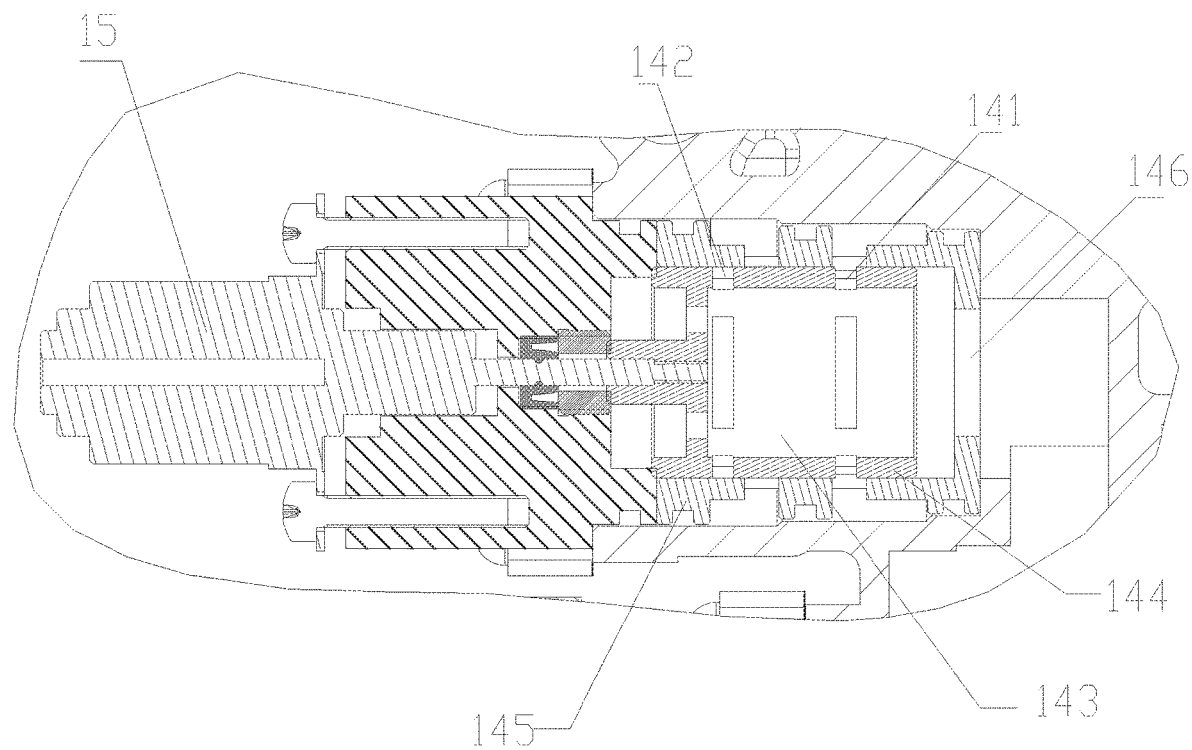

Referring to FIG. 4 and FIG. 5, the temperature control valve 14 comprises an adjusting element 144 and a fixing element 145 embedded disposed; the adjusting element 144 moves along the axis of the fixing element 145 in relation to the fixing element 145 under the action of the first stepped motor 15; the side wall of the adjusting element 144 and the fixing element 145 are respectively disposed with two water holes; the water holes of the adjusting element 144 and the fixing element 145 are correspondingly connected one by one to form the cool water inlet hole 141 and the hot water inlet hole 142; when the adjusting element 144 moves in relation to the fixing element 145, the coinciding area of the water hole of the adjusting element 144 and the fixing element 145 changes, making the water area of the cool water inlet hole 141 and the hot water inlet hole 142 change and the proportion of the cool water and hot water of the mixing water chamber 143 change.

Figure 6:
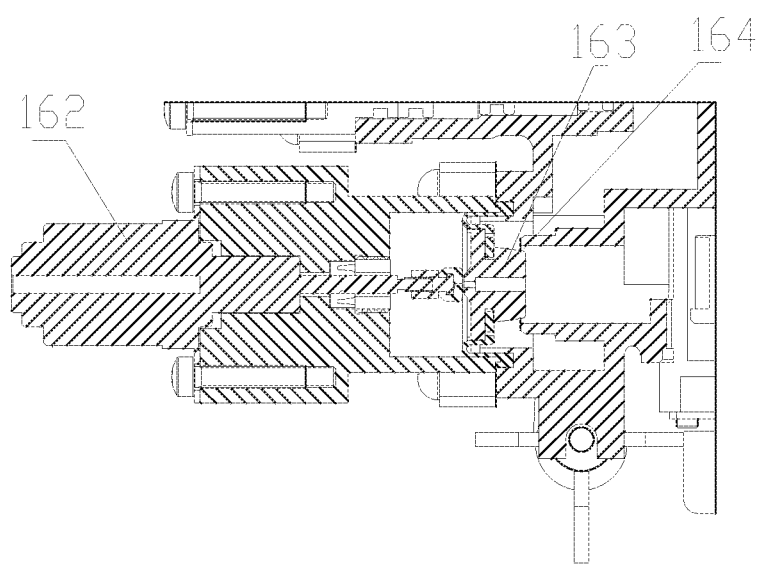
FIG. 6 and FIG. 7 illustrate the adjusting process of the volume regulation valve of Embodiment 1.
Figure 7:
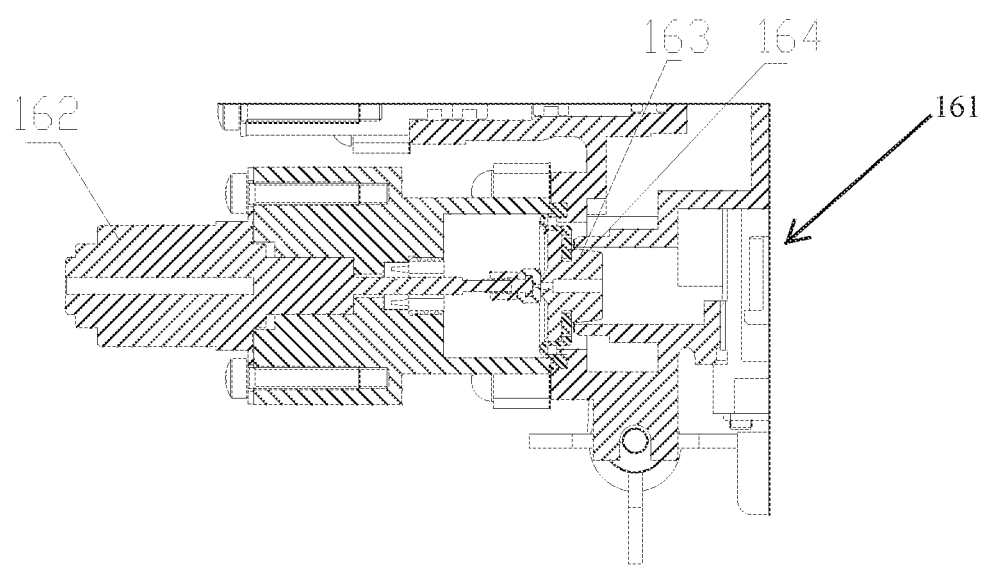
Figure 8:
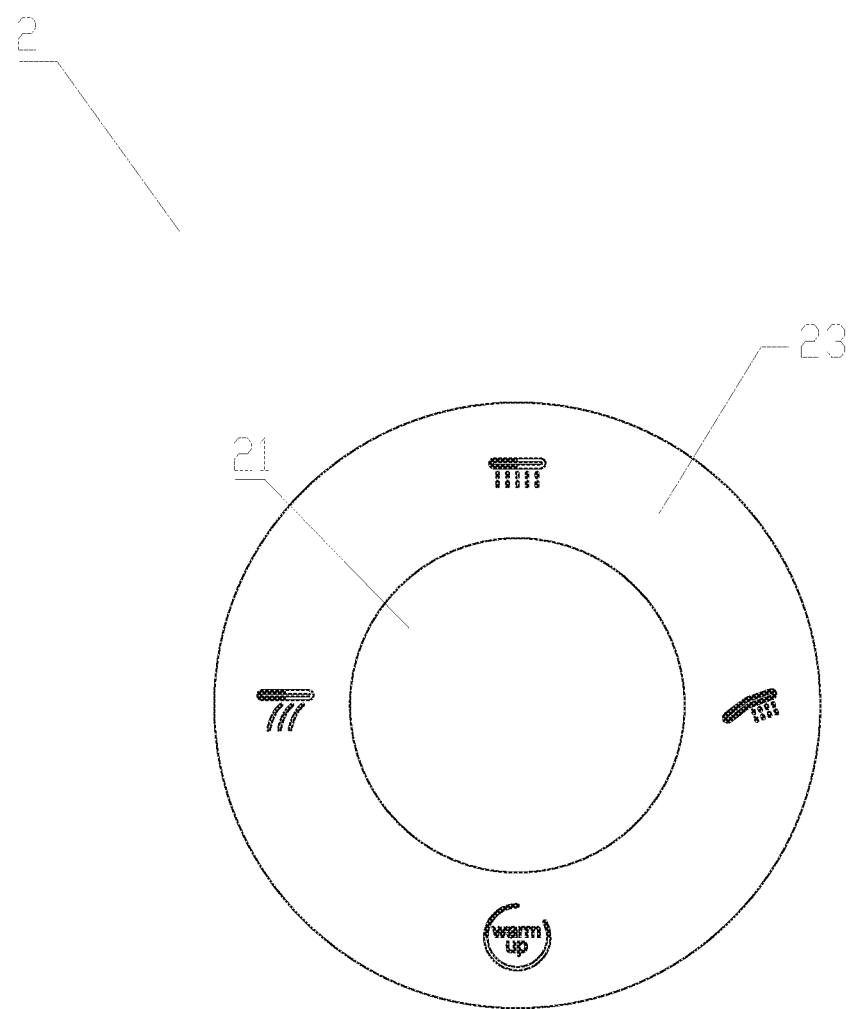
FIG. 8 illustrates a schematic diagram of the control panel in shutdown state of Embodiment 1.
Figure 9:
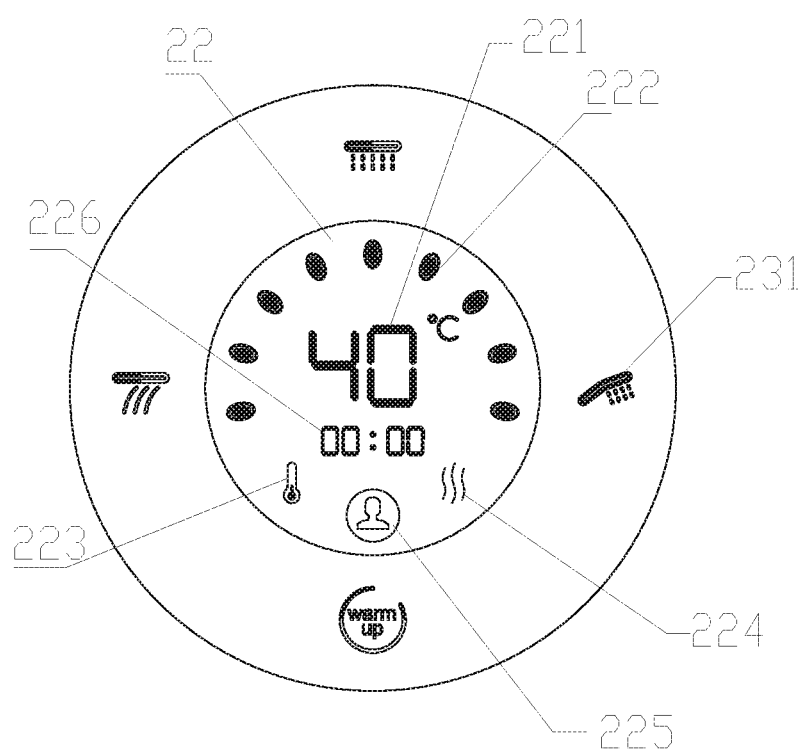
FIG. 9 illustrates a schematic diagram of the control panel in the initial state of starting up of Embodiment 1.
Figure 10:
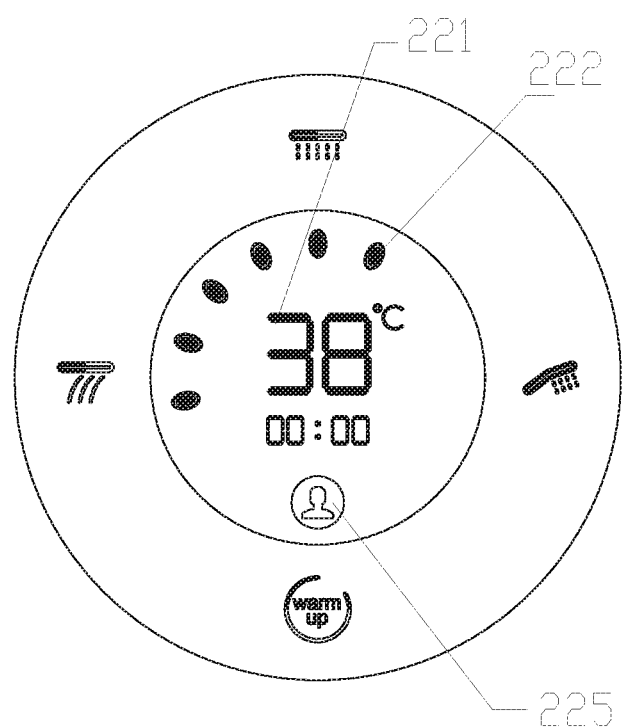
FIG. 10 illustrates a schematic diagram of the control panel in lock mode of Embodiment 1.
Figure 11:
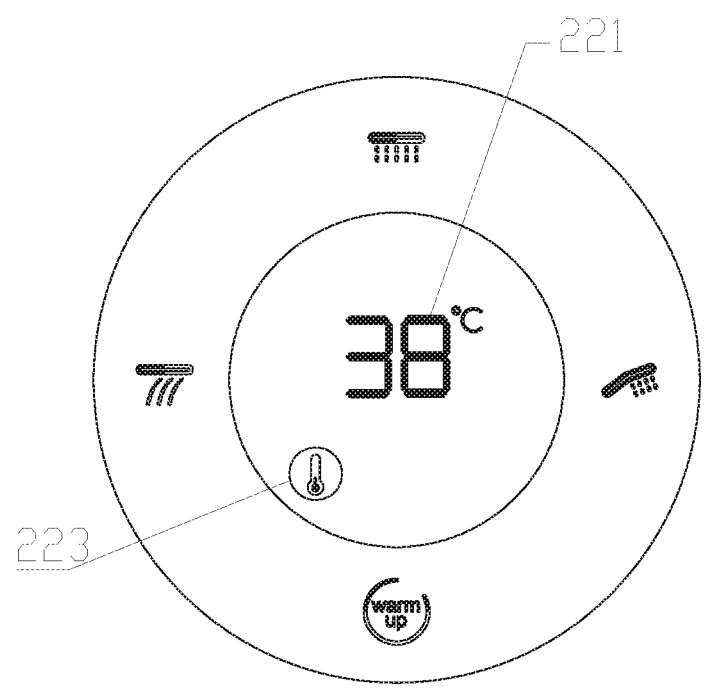
FIG. 11 illustrates a schematic diagram of the control panel in temperature adjusting mode of Embodiment 1.
Figure 12:
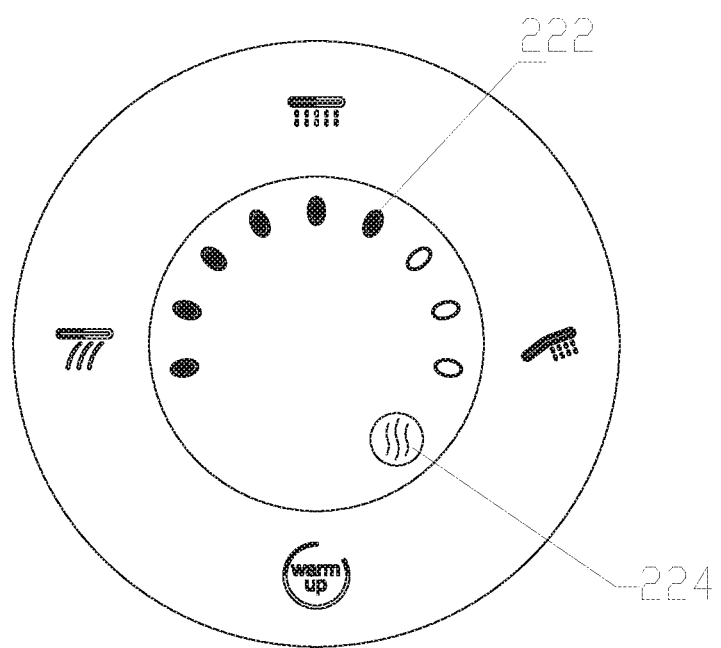
FIG. 12 illustrates a schematic diagram of the control panel in volume adjusting mode of Embodiment 1.
Figure 13:
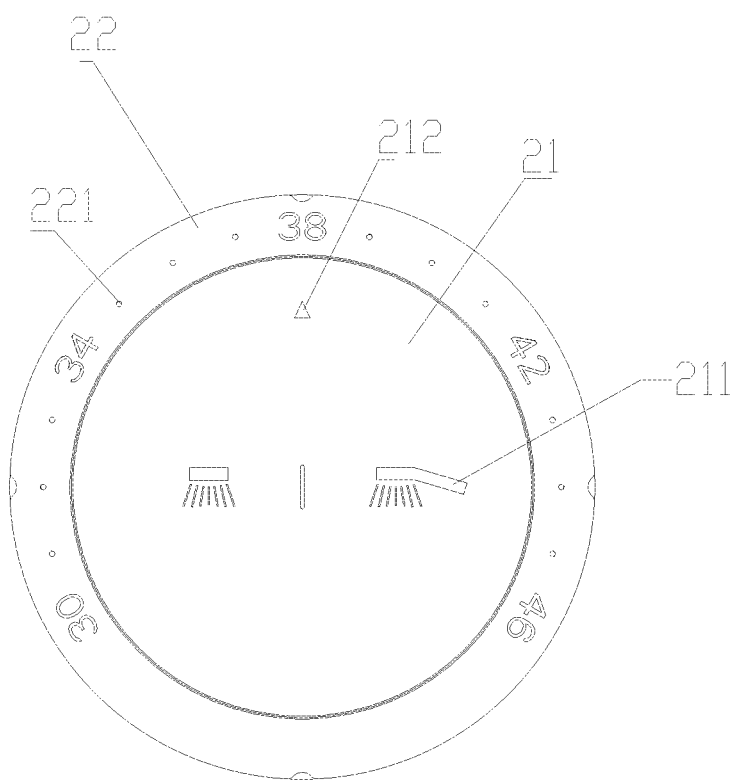
FIG. 13 illustrates a schematic diagram of the control panel with the outlet terminal being switched of Embodiment 2.
Figure 14:
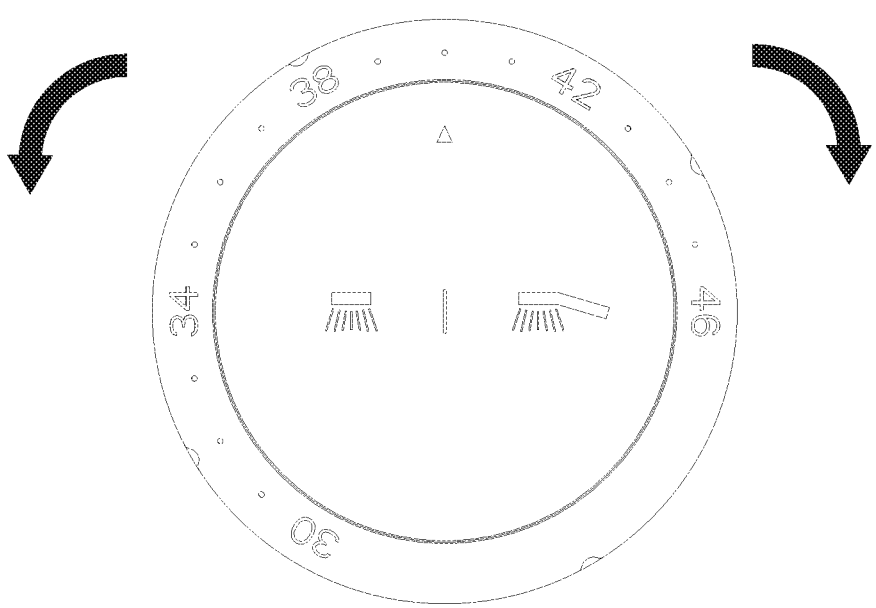
FIG. 14 illustrates a schematic diagram of the control panel with the volume being adjusted of Embodiment 2.

Referring to FIG. 6 and FIG. 7, the pivot valve 161 comprises a plug 163 which is coaxially arranged with the outlet 164 of the pivot valve 161; when the second stepped motor 162 rotates, the output shaft of the second stepped motor 162 moves in the direction closing to the plug 163 in the axial direction, the abutting force between the output shaft and the plug 163 pushes the plug 163 to insert to the outlet 164 in the axial direction; the external periphery of the plug is disposed with a round step, the direction between the round step and the outlet 164 is gradually reduced as the plug 163 is inserting to the outlet, making the water area of the outlet reduced and achieving the volume regulation.

In this embodiment, the cool water inlet hole 141, the hot water inlet hole 142 and the mixing water outlet hole 146 are respectively disposed with a temperature sensor.

The controller 1 is further disposed with a power supply module 100, which is a battery or a rectification filter circuit connected to the main supply. Therefore, if the power supply module 100 is a battery, the controller 1 doesn't need an external power supply and therefore the risk of electric leakage is reduced.

The control panel 2 is power supplied by the controller 1. The LCD component 22 is connected to the water supply module. On the other hand, to achieve that when the knob is rotated, the temperature or volume is adjusted, the LCD component is further disposed with a plurality of Hall sensors.

Embodiment 2

This embodiment is provided with a control panel with an embedded power. The LCD screen of Embodiment 1 is removed to save energy and provide the control panel 2 a longer usage period.

The control panel 2 comprises a knob. The top surface of the knob is disposed with an inner ring 21 and an outer ring 22. The inner ring 21 is disposed with outlet buttons 211 corresponding to the first outlet 17 and the second outlet 18. When one of the outlet buttons 211 is touched, the control panel 2 starts up, and the circuit of the control panel 2 sends a signal to one of the electromagnetic valves 19 to control the first outlet 17 or the second outlet 18 to open. The outer ring 22 is a temperature adjusting ring. When the temperature adjusting ring is rotated, the circuit of the control panel 2 sends a signal to the first stepped motor 15 of the controller 1 to rotate a circuit angle to adjust the outlet temperature;

To indicate the present mode of the control panel, the inner ring 21 is further disposed with an indication light 212, which is light when the control panel 2 starts up.

The surface of the temperature adjusting ring is disposed with scales 221; the temperature adjusting ring, when being rotated, rotates in relation to the inner ring 21; when a scale 221 of the temperature adjusting ring is rotated to the position over the indication light 212, the scale 221 is corresponding to the present outlet temperature. Moreover, a rotating restricting structure is disposed between the inner ring 21 and the temperature adjusting ring; when the temperature adjusting ring rotates to the position between two end points of the scale above the indication light 212, the temperature adjusting ring is restricted by the rotating restricting structure in the temperature reducing direction or the temperature raising direction. This avoids temperature being adjusted over high or over low. The scales 221 is disposed with numbers with space for the user to directly recognize to the water temperature. in this embodiment, the numbers are 30, 34, 38, 42, 46, in which, 30 and 46 are two end points of the scales, the temperature regulating arrange is 30°-46°.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:
1. A shower control system, comprising:
a controller,
a control panel,
a pressure balancing valve, and
a temperature control valve, wherein:
the controller comprises a cool water inlet and a hot water inlet,
the pressure balancing valve comprises a first chamber and a second chamber,
the temperature control valve comprises a mixing water chamber and a mixing water outlet hole,
cool water flows into the first chamber through the cool water inlet and hot water flows into the second chamber through the hot water inlet,
the first chamber is connected to the mixing water chamber through a cool water inlet hole set and the second chamber is connected to the mixing water chamber through a hot water inlet hole set,
the temperature control valve is controlled by a first stepper motor to adjust a first water passage area of the cool water inlet hole set and a second water passage area of the hot water inlet hole set so as to adjust a proportion of the cool water and the hot water in the mixing water chamber,
the mixing water outlet hole is connected to a volume regulation valve,
the volume regulation valve comprises a pivot valve and a second stepper motor,
the second stepper motor is configured to adjust a third water passage area of an outlet opening of the pivot valve,
the outlet opening of the pivot valve is connected to a first outlet and a second outlet,
the first outlet and the second outlet are respectively disposed with an electromagnetic valve to control the first outlet and the second outlet to close and to open,
the control panel comprises a knob,
a top surface of the knob comprises an inner ring and an outer ring,
the outer ring comprises outlet buttons respectively corresponding to the first outlet and the second outlet,
the inner ring comprises a display screen with a temperature displaying area, a volume displaying area, a temperature adjusting mode icon, a volume adjusting mode icon and a lock mode icon,
when the knob is pressed for at least a specified length of time:
the control panel is turned on,
the display screen lights up,
the temperature displaying area and the volume displaying area respectively displays a first temperature and a first volumetric flow rate for a last usage of the shower control system, and
the lock mode icon is selected and
when a first outlet button of the outlet buttons is touched after the control panel is turned on:
the first outlet button lights up,
the controller sends a first signal to the electromagnetic valve corresponding to the first outlet to open, and
water is discharged from the first outlet at the first temperature and the first volumetric flow rate,
when a second outlet button of the outlet buttons is touched after the control panel is turned on:
the second outlet button lights up,
the controller sends a second signal to the electromagnetic valve corresponding to the second outlet to open, and
water is discharged from the second outlet at the first temperature and the first volumetric flow rate,
when the knob is pressed after one of the first outlet button or the second outlet button is touched:
the control panel is switched to a lock mode, and
a temperature and a volumetric flow rate of the first outlet, when the first outlet button is the one that was touched, or a temperature and a volumetric flow rate of the second outlet, the second outlet is the one that was touched, are switched to a second temperature and a second volumetric flow rate according to preset values for the lock mode,
when the knob is rotated while the control panel is in the lock mode, the temperature and the volumetric flow rate of the first outlet and the second outlet do not change, when the knob is rotated while the control panel is in the lock mode to select the temperature adjusting mode icon or the volume adjusting mode icon and the knob is pressed while the temperature adjusting mode icon or the volume adjusting mode icon is selected:
the control panel is switched to a temperature adjusting mode when the temperature adjusting mode icon is selected or a volume adjusting mode when the volume adjusting mode icon is selected,
when the control panel is switched to the temperature adjusting mode, the volume displaying area is unlit,
when the control panel is switched to the volume adjusting mode, the temperature displaying area is unlit,
when the control panel is in the temperature adjusting mode:
when the knob is rotated:
a displayed content of the temperature displaying area changes;
when the knob is pressed a first time:
a first electrical signal corresponding to the displayed content of the temperature displaying area is generated and sent to send to the first stepper motor to control a rotating angle of the first stepper motor so as to change the temperature, and
when the knob is pressed a second time, the control panel exits from the temperature adjusting mode, and
when the control panel is in the volume adjusting mode:
when the knob is rotated:
a displayed content of the volume displaying area changes,
when the knob is pressed a first time:
a second electrical signal corresponding to the displayed content of the volume displaying area is generated and sent to the second stepper motor to control a rotating angle of the second stepper motor so as to change the volume, and
when the knob is pressed a second time, the control panel exits from the volume adjusting mode.

2. The shower control system according to claim 1, wherein the displayed content of the temperature display area is a digital representation corresponding to a target temperature of the water flowing through the first outlet or the second outlet.

3. The shower control system according to claim 2, wherein:
the volume display area is an arc-shaped volume meter disposed at an outer side of the temperature display area, and
when the control panel is in the volume adjusting mode:
when the knob is rotated:
a lighting area of the arc-shaped volume meter changes to be longer or be shorter, and
the volumetric flow rate of the water flowing through the first outlet or the second outlet is correspondingly increased or decreased.

4. The shower control system according to claim 1, wherein:
when the lock mode icon is selected, an external periphery of the lock mode icon displays a lighting ring,
when the temperature adjusting mode icon is selected:
the lighting ring at the external periphery of the lock mode icon is unlit, and
an external periphery of the temperature adjusting mode icon displays a lighting ring, and
when the volume adjusting mode icon is selected:
the lighting ring at the external periphery of the lock mode icon is unlit, and
an external periphery of the volume adjusting mode icon displays a lighting ring.

5. The shower control system according to claim 1, wherein:
the display screen further comprises a timer display area, and
when the control panel is turned on, the timer display area starts to record a shower duration.

6. The shower control system according to claim 1, wherein:
when the control panel is in the lock mode, the temperature adjusting mode or the volume adjusting mode:
the outlet buttons of the outer ring remain active, and
the outlet buttons are configured to be selected for selecting one of the first outlet or the second outlet for discharging the water.

7. The shower control system according to claim 1, wherein:
the temperature control valve comprises an adjusting element and a fixing element embedded with the adjusting element,
the first stepper motor is configured to drive the adjusting element to move along an axial direction of the fixing element,
a side wall of the adjusting element and a side wall of the fixing element respectively comprise two water passage holes,
each of the two water passage holes of the adjusting element and a corresponding one of the two water passage holes of the fixing element are correspondingly in fluid communication to form the cool water inlet hole set and the hot water inlet hole set, and
when the adjusting element moves along the axial direction of the fixing element:
a coinciding area of the two water passage holes of the adjusting element and the two water passage holes of the fixing element changes, resulting in the first water passage area of the cool water inlet hole set and the second water passage area of the hot water inlet hole set changing.

8. The shower control system according to claim 1, wherein:
the pressure balancing valve comprises a stopping element and a movable element,
the stopping element comprises a chamber,
a side wall of the stopping element comprises an opening connected to the chamber,
the movable element is disposed in the chamber to divide the chamber into two separate chambers,
two flowing holes are respectively formed between an upper end of the moving element and an upper surface of the opening and between a lower end of the moving element and a lower surface of the opening end,
when the cool water and the hot water respectively flows into the two separate chambers, the cool water and the hot water in the two separate chambers respectively generates a pressure force on the movable moving element in opposite directions, and
when the two pressure forces are not equal:
the movable element moves to a first one of the two separate chambers having a lower pressure, a first one of then the two flowing holes of a second one of the two separate chambers with a higher pressure decreases, a second one of the two flowing holes of the first one of the two separate chambers with the lower pressure enlarges, and the two pressure forces of the two separate chambers are rebalanced.

9. The shower control system according to claim 1, wherein:

the pivot valve comprises a plug coaxially disposed with the outlet opening of the pivot valve, when the second stepper motor rotates:

an output shaft of the second stepper motor moves in an axial direction facing the plug, and an abutting force between the output shaft and the plug pushes the plug to insert into the outlet opening in the axial direction, an external periphery of the plug comprises a round trapezoidal portion, and when the plug is inserted into the outlet:

a distance between the round trapezoidal portion and the outlet opening is gradually reduced to enable the third water passage area of the outlet opening to be reduced.

10. The shower control system according to claim 1, wherein:

the controller further comprises a power supply module, and the power supply module comprises a battery or a rectification filter circuit connected to commercial power.

11. The shower control system according to claim 10, wherein the knob is disposed with a liquid crystal display (LCD) connected to the power supply module.

\* \* \* \* \*